E. G. LAMSON.
Table Cutlery.
No. 101,139.
Patented March 22, 1870.
Fig. 1
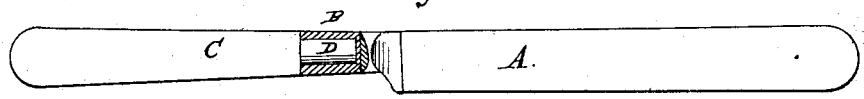
Fig. 2
Fig. 3.  Fig. 4.
 
Witnesses
Harry King.
C. L. Everts
Inventor
E. G. Lamson
per
Alexander Mason
Attys

United States Patent Office.

EBENEZER G. LAMSON, OF WINDSOR, VERMONT.

Letters Patent No. 101,139, dated March 22, 1870.

IMPROVEMENT IN TABLE-CUTLERY.

The Schedule referred to in these Letters Patent and making part of the same.

*To all whom it may concern:*

Be it known that I, EBENEZER G. LAMSON, of Windsor, in the county of Windsor and in the State of Vermont, have invented certain new and useful Improvements in Table-Cutlery; and do hereby declare that the following is a full, clear, and exact description thereof, reference being had to the accompanying drawings and to the letters of reference marked thereon making a part of this specification.

The nature of my invention consists in the mode or manner of attaching the handle to the blades of knives, forks, and cutlery of all kinds, and such instruments as come under the head of cutlery.

In order to enable others skilled in the art to which my invention appertains to make and use the same, I will now proceed to describe its construction and operation, referring to the annexed drawings, in which—

Figure 1 is a side view of a knife and handle, the bolster being in section;

Figure 2 is a side view of a fork and handle;

Figure 3 is an end view; and

Figure 4 is a cross-section.

I am aware of the great variety of ways which have been adopted, and many of the devices have been patented, both solid handles of ivory, horn, bone, wood, rubber, &c. All these have been secured to the blade by boring a hole in the handle, and then inserting the tang or the part projecting from the blade or bolster. The hole, or the space around the tang, is then filled with cement, made of some kind of material, which is melted when it comes in contact with too hard a heat, and the handles are loosened. There is also a pin put through the handle and tang to hold on the solid handle, and other ways of securing the solid handle to cutlery, but the way described has been used the most extensively. All of them have their objections.

Other ways of putting on handles have been used extensively, such as drawing out a flat tang, and putting on what is called scales, by pinning them on each side of the tang.

In all the ways, so far as I am aware, the tang is round or flat, and the handle has a hole or mortise in it, or held on by pieces clamped onto the handle, or the scales are riveted onto the tang.

By my method of making cutlery, which I will presently describe, I combine cheapness and durability, and the handles are so attached that there is no loss by splitting the handle or by driving through pins or rivets, as is the case in the way that most of the cutlery is made at the present time.

In the way I put the handle into the blade or fork the end of the handle is firmly secured, as it is surrounded with metal, and no danger from loss of handles. The gain will be considerable in that particular in manufacturing, as also it will be made by machinery, and not as much skilled labor will be required.

My improvement will consist partly in the process of making handles and blades to interchange.

The way of making blades is to take round steel, (other shapes can be used to get different kinds of bolsters; for table-knives we could use half-inch round steel,) draw out the blade by trip-hammer or rolling-mill, or any of the well-known ways. The drop is then used to shape the bolster, the blade pressed under a press with properly-shaped dies, and the blade is formed.

A hole is then drilled in the end of the steel, say about three-eighths of an inch in diameter, more or less, according to the size of knives, and the holes should be about one inch deep, or as deep as is required.

A screw may be cut on the inside of the hole, and the handle made to fit, and screwed into the end of the blade or bolster; or the handle may be driven in, and a pin put through the bolster, or that part which runs up onto the handle.

The best way, I think, from experiments tried, will be to drive the handle into the hole, and then, by a press or drop, or any convenient way, with dies compress the bolster, or that part extending onto the handle, making it smaller, so as to confine the handle firmly.

For the purpose of saving stock, I take the knife or fork, after the hole is drilled with a round hole, and put that part under a drop-hammer, or press, or some convenient machine; and when it is put under the dies its hole is round, but after the press is used upon it, it becomes oval or flat. In this way I can use pieces of bone, ivory, horn, and other material which could not be used if the hole remained round.

When the handle is fitted by machinery, or the tenon on the handle of any shape, and the mortise or hole in the end of blade or fork, and the handle is forced or screwed in, then a pin is put through, or the metal is condensed to hold the handle in place.

The hole I shall form, in some kinds of cutlery, by means of a drop-hammer, and while it is in a hot state, by means of dies, and not use the drill, as before described.

I shall, also, when shaping the end of blade, give any shaped bolster desired—what is called oval, concave, Waterloo, or any of the well-known shapes. I also shall make the handles round in the most expeditious way of turning; and by making the hole uniform the knives and handles will interchange, and the same blades or forks can be handled with ivory, horn, bone, wood, or any other suitable material.

In the annexed drawings—

A represents the blade or fork;
B, the bolster at the inner end thereof;
C, the handle; and
D, the tenon on the handle, which is inserted in the hole made in the bolster B.

Having thus fully described my invention,

What I claim as new, and desire to secure by Letters Patent, is—

As a new article of manufacture, a knife, fork, or other table-cutlery, having a socket at its rear end, within which is inserted a handle having a tenon on its end, substantially as set forth.

In testimony that I claim the foregoing, I have hereunto set my hand this 5th day of February, 1870.

E. G. LAMSON.

Witnesses:
E. E. LAMSON,
L. W. HAWLEY.